United States Patent [19]

Ortiz et al.

[11] Patent Number: 4,866,726
[45] Date of Patent: Sep. 12, 1989

[54] BORE SUPPORT ASSEMBLY AND A METHOD OF LASER CONSTRUCTION

[75] Inventors: Mark V. Ortiz, Mountain View; William A. Shull, Portola Valley, both of Calif.

[73] Assignee: Spectra Physics, Inc., San Jose, Calif.

[21] Appl. No.: 206,819

[22] Filed: Jun. 15, 1988

[51] Int. Cl.$^4$ .............................................. H01S 3/03
[52] U.S. Cl. ...................................... 372/65; 372/61; 372/98
[58] Field of Search ...................... 372/65, 61, 107, 98

[56] References Cited

U.S. PATENT DOCUMENTS

| | | | |
|---|---|---|---|
| 3,784,927 | 1/1974 | Rudolph | 372/65 |
| 3,875,530 | 4/1975 | Manoukian | 372/65 |
| 3,988,698 | 10/1976 | Crane et al. | 372/65 |
| 4,081,762 | 3/1978 | Gdser et al. | 372/88 |
| 4,203,080 | 5/1980 | Wright et al. | 372/107 |
| 4,278,324 | 7/1981 | Zipfel | 372/107 |
| 4,644,554 | 2/1987 | Sheng | 372/61 |
| 4,730,138 | 3/1988 | Madiniroff | 372/65 |

*Primary Examiner*—Leon Scott, Jr.
*Attorney, Agent, or Firm*—Killworth, Gottman, Hagan & Schaeff

[57] ABSTRACT

A bore support assembly is used in construction of an outer envelope of a laser and for supporting an inner bore tube of the laser near its free end. The bore support assembly includes a generally planar joiner ring having radially spaced outer and inner peripheries. At its outer periphery, it becomes rigidly attached to the interior of the envelope during formation of the latter from separate bore assembly tube and reservoir tube sections. Its inner periphery has a central opening receiving the bore tube. The bore support assembly also includes a spider structure and a preform element for attaching it to the exterior of bore tube. The spider structure has an outer peripheral portion attached to the inner periphery of the joiner ring so as to position the spider structure on one side of the joiner ring and along the central opening thereof. The spider structure also has an inner peripheral portion spaced radially inwardly from the outer peripheral portion and defining a second smaller central opening receiving the bore tube therethrough. A plurality of resiliently flexible spokes extend radially between and integrally interconnect the outer and inner peripheral portions. The joiner ring has a plurality of heat transmission limiting apertures defined through it between its inner and outer peripheries.

30 Claims, 2 Drawing Sheets

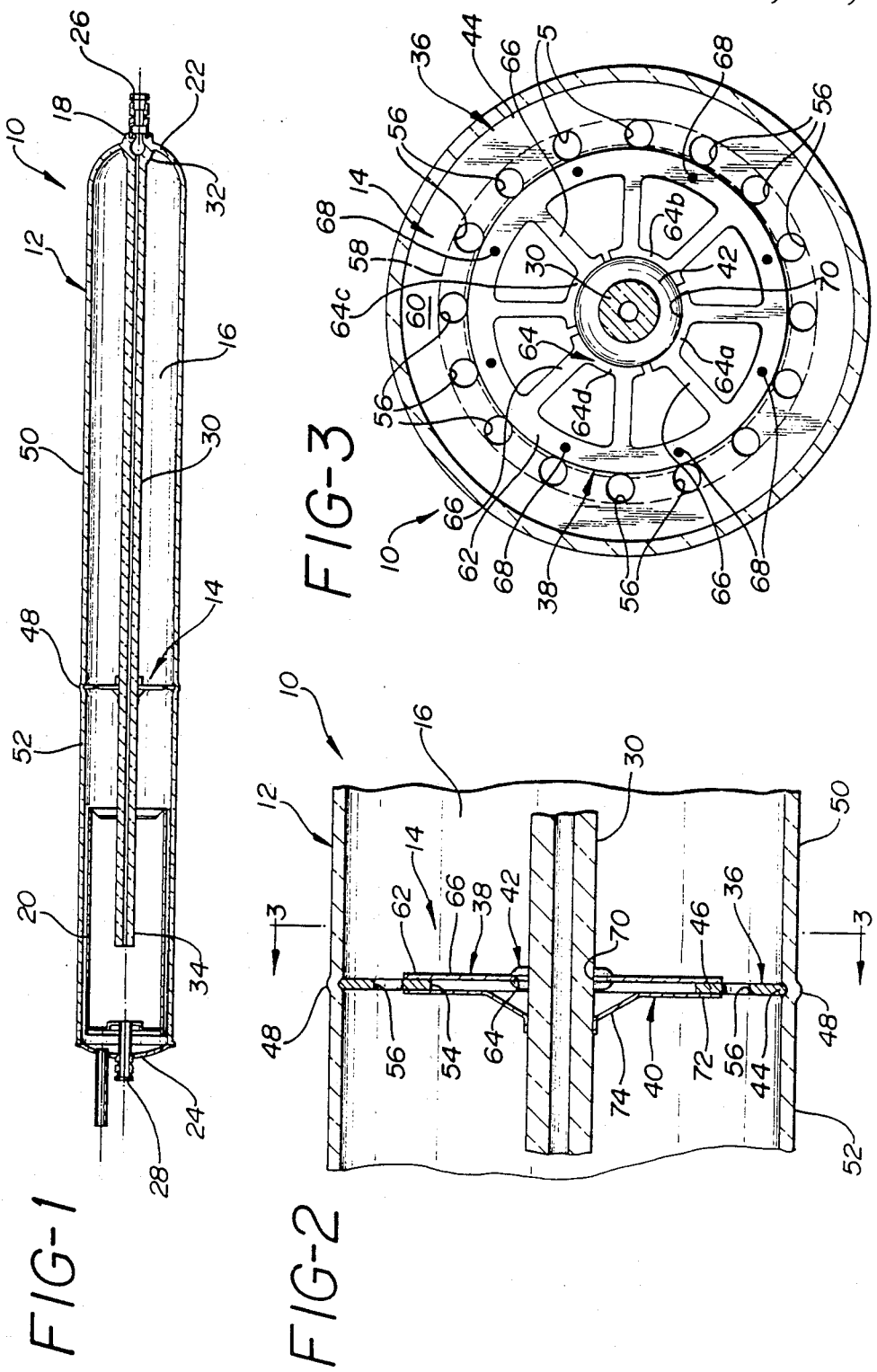

BORE SUPPORT ASSEMBLY AND A METHOD OF LASER CONSTRUCTION

BACKGROUND OF THE INVENTION

The present invention generally relates to laser construction and, more particularly, to a bore support assembly for supporting a bore tube in a laser and to a method of constructing a laser by joining two or more outer envelop sections utilizing one or more of the bore support assemblies.

Gas discharge lasers, such as helium-neon gas lasers, use a bore tube for confining the discharge to maximize the power output. In the coaxial design of such lasers, an outer envelop defines a cavity, an anode and cathode are located within the cavity at opposite ends of the outer envelop, end mirrors are mounted on the ends of the envelop, and the bore tube is mounted within the envelop in alignment with the end mirrors. One end of the bore tube is connected to one end of the outer envelop so as to be fixed in position. The other end of the bore tube is free and projects within the cavity toward the opposite end of the envelop.

The bore tube is heated by operation of the laser to a substantially higher temperature than the temperature reached by the outer envelop. Since the bore tube is subjected to a higher temperature than the outer envelop as the laser is energized from a non-operating condition to an operating condition, the length of the bore tube increases at a slightly greater rate than the length of the outer envelop. The free end of the bore tube must therefore be permitted to shift longitudinally with respect to the outer envelop to accommodate this slight difference in thermal expansion.

While longitudinal, or axial, expansion of the bore tube must be permitted, shifting of the bore tube free end transverse to the laser axis must be restrained to prevent loss of laser power. In one arrangement disclosed in U.S. Pat. No. 4,644,554, issued Feb. 17, 1987 to Sheng, and assigned to the assignee of the present invention, the free end of the bore tube is supported in the laser outer envelop by a spider structure. The spider structure is constructed to be substantially rigid against transverse movement of the free end of the bore tube while permitting sufficient longitudinal movement of the bore tube free end to accommodate the differential thermal expansion of the bore tube with respect to the envelop which occurs during laser operation.

The above-described arrangement for supporting the bore tube has been highly successful in construction of shorter, lower power gas discharge lasers. However, this arrangement cannot be directly scaled up for use in the construction of longer, higher power gas discharge lasers. Thus, a need exists for a fresh approach to construction of higher power gas discharge lasers so as to overcome the construction difficulties which were previously experienced.

SUMMARY OF THE INVENTION

The present invention provides a bore support assembly and a method of constructing a laser designed to satisfy the aforementioned needs. Particularly, the bore support assembly of the present invention for use in a laser includes a joiner ring and a spider structure. The joiner ring has radially spaced outer and inner peripheries. Its outer periphery is capable of rigid attachment to an outer envelop of the laser at the interior thereof. Its inner periphery defines a first central opening of a first size adapting the ring to receive an inner bore tube of the laser therethrough. The spider structure is positioned on one side of the joiner ring and extends generally along the central opening thereof. The spider structure has an outer peripheral portion rigidly attached to the inner periphery of the joiner ring, and an inner peripheral portion spaced radially inwardly from the outer peripheral portion. The inner peripheral portion of the spider structure defines a second central opening of a second size smaller than the size of the first central opening of the joiner ring which adapts the inner peripheral portion to receive the bore tube of the laser therethrough and to be rigidly interconnect therewith. The spider structure also includes a plurality of flexible members extending radially between and interconnecting its outer and inner peripheral portions.

More particularly, the joiner ring is generally planar in configuration and of a size at its outer periphery adapting it to be positioned within and transversely across the outer envelop of the laser. Further, the joiner ring includes a plurality of heat transmission limiting means in the form of a series of apertures defined through the ring between its inner and outer peripheries thereof. Still further, the flexible members of the spider structure are spokes, and the spokes and outer and inner peripheral portions of the spider structure are disposed in a common plane and capable of withstanding transverse shifting of the inner bore tube relative to the outer envelop but capable of accommodating longitudinal differential thermal expansion between the outer envelop and inner bore tube.

Additionally, the inner peripheral portion of the spider structure is discontinuous, being defined in circumferentially-spaced arcuate segments. The flexible spokes of the spider structure are grouped in pairs, with each pair interconnecting one of the inner peripheral portion segments with the outer peripheral portion of the spider structure.

Also, the bore support assembly includes a spring-type spider being positioned on an opposite side of the joiner ring and capable of slidably supporting the inner bore tube, and an annular-shaped member in the form of a preformed glass ring for rigidly interconnecting the inner peripheral portion of the spider structure to the exterior of the bore tube. The spring-type spider extends generally along the central opening of the joiner ring and includes an outer ring portion rigidly attached to the inner periphery of the joiner ring. The spring-type spider also includes a plurality of inner spring fingers attached to the outer ring portion and extending radially inwardly there from. The fingers are capable of resiliently and slidably engaging the inner bore tube when received through the second central opening of the spider structure. The fingers are bent outwardly at an acute angle to the plane of the outer ring portion of the spring-type spider.

The laser construction method of the present invention includes the steps of: inserting a bore support assembly over a free end of a bore tube being fixedly mounted at its opposite end in one end of a first section of an outer envelop of a laser to be constructed: bringing an outer periphery of the bore support assembly into alignment and contact with the opposite, open end of the first section of the outer envelop; inserting the free end of the bore tube into an open end of a second section of the outer envelop; bringing the open end of the second section of the outer envelop into alignment and contact with the open end of the first section thereof and into alignment with the periphery of the bore support assembly; and heating the first and second outer envelop sections and the bore support assembly to increase the temperature of the outer periphery of the bore support assembly and cause melting and bonding of the respective open ends of the first and second sections together and to the outer periphery of the bore support assembly.

More particularly, the inserting of the bore support assembly over the free end of the bore tube includes inserting a spring-type spider of the bore support assembly over the bore tube free end and into sliding engagement with the bore tube. Also, the steps can be repeated for installing another bore support assembly over the free end of the bore tube and attaching an open end of a third section to an opposite open end of the second section of the outer envelop to construct a longer laser.

Further, the heating of the first and second outer envelop sections and the bore support assembly is induced by r.f. radiation. The transmission of heat in the bore support assembly from the outer periphery thereof radially inwardly toward the bore tube during heating of the first and second sections of the outer envelop and of the bore support assembly is limited. Also, a bonding element is applied to an inner periphery of the bore support assembly which fits over the bore tube upon insertion of the bore support assembly over the free end thereof. The outer envelop sections and the bore support assembly are heated to a temperature below the melting point of the outer envelop section and above the melting point of the bonding element to cause melting and adherence of the bore support assembly at its inner periphery by the bonding element to the bore tube.

Accordingly, it is an object of the present invention to provide a bore support assembly which serves a dual function of supporting the bore tube adjacent its free end within the outer envelop of the laser in alignment with the opposite end mirrors of the laser and facilitating the construction of the outer envelop; to provide a bore support assembly having a spider structure which restrains transverse shifting of the bore tube free end but accommodates differential axial thermal expansion of the bore tube relative to the envelop; to provide a bore support assembly having a joiner ring which when inductively heated provides a source of heat for causing melting of the open ends of envelop sections and bonding of the ends together and with the periphery of the joiner ring to construct in a reinforced manner the outer envelop; to provide a bore support assembly having a preform glass element for bonding the spider structure to the bore tube; and by using multiple ones of standard bore support assemblies and tube sections to provide a modular approach to constructing lasers of different lengths.

Other objects and advantages of the invention will be apparent from the following description, the accompanying drawings and the appended claims.

BRIEF DESCRIPTION OF THE DRAWINGS

FIG. 1 is a longitudinal axial sectional view of a laser employing a bore support assembly, and having an outer envelop, constructed in accordance with the method of the present invention;

FIG. 2 is an enlarged view of a fragmentary portion of the laser of FIG. 1, illustrating the bore support assembly positioned about the bore tube of the laser and at a joint formed between a bore assembly outer tube section and a reservoir tube section to provide an outer envelop of the laser;

FIG. 3 is a cross-sectional view of the laser taken along line 3—3 of FIG. 2;

DETAILED DESCRIPTION OF THE PREFERRED EMBODIMENT

Figure 4:
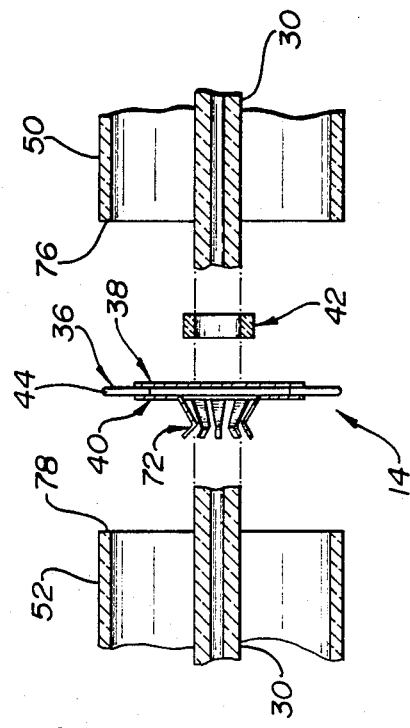
FIG. 4 is an exploded view of the components of the laser located at the joint illustrated in FIG. 2.

Reference is made to FIG. 1 of the drawings which illustrates a laser 10, such as a gas discharge type laser. The laser 10 has an outer envelop 12 constructed in accordance with the method of the present invention, utilizing a bore support assembly 14 of the present invention.

In its basic components, the laser 10 includes the outer envelop 12 which defines a hollow cylindrical cavity 16, and an anode 18 and a cathode 20 located within the cavity 16 at opposite right and left ends 22, 24 of the outer envelop 12. Also, right and left end mirrors 26 and 28 are mounted on the respective ends 22, 24 of the envelop 12, and a bore tube 30 is mounted in coaxial relation with the envelop 12 within its cavity 16. The bore tube 30 is aligned with the right and left end mirrors 26, 28, and the right end 32 of the bore tube 30 is connected to the right end 22 of the outer envelop 12 adjacent the right end mirror 26. The left end 34 of the bore tube 30 is free and projects within the cavity 16 toward the opposite, left end 24 of the envelop 12. Both the outer envelop 12 and inner bore tube 30 are composed of a suitable glass material.

Turning now to FIGS. 2 and 3, as well as FIG. 1, there is seen the bore support assembly 14 of the present invention which supports the bore tube 30 at a location nearer to its left, free end 34 than to its right, fixed end 32. The bore tube 30 is held within the outer envelop 12 in alignment with the opposite right and left end mirrors 26, 28 and in coaxial alignment with envelop 12. The bore support assembly 14 is also employed in constructing the outer envelop 14 of the laser 10 in accordance with the method of the present invention which will be described later.

Basically, the bore support assembly 14 includes a joiner ring 36, a "hard" spider structure 38, a "soft" spring-type spider 40 and a preform annular element 42. The "hard" and "soft" characteristics of the respective spider structure 38 and spring-type spider 40 refer to the relative degree of yieldability and stiffness designed into them by their particular configurations, with the "hard" characteristic meaning less yieldable and more stiff than the "soft" characteristic. The joiner ring 36 and hard spider structure 38, preferably, are made from material such as Kovar sheet, ASTM F15-6, which is a nickel-iron alloy having a low coefficient of expansion. The soft spider 40, preferably, is made from material such as 504 stainless steel.

The joiner ring 36 of the bore support assembly 14 has radially spaced outer and inner peripheries 44, 46 of concentric circular configurations. The outer periphery 44 of the ring 36 is rigidly attached to the interior of the outer envelop 12 by being, in effect, captured in a circumferential joint 48 formed between a bore assembly outer tube section 50 and a reservoir tube section 52 by the method used in constructing the outer envelop 12 of the laser 10. The inner periphery 46 of the ring 36 defines a first central opening 54 through which extends the bore tube 30 of the laser 10.

Also, the joiner ring 36 is generally planar and of a diametric size at its outer periphery 44 to fit tightly within and transversely across the cavity 16 of the outer envelop 12 of the laser 10. As mentioned, its outer periphery 44 extends partially within and is captured by the circumferential joint 48 in the outer envelop 12. Further, the ring 36 includes a plurality of heat transmission limiting means, preferably, in the form of a series of apertures 56 circumferentially-spaced apart and defined through the ring 36 between its outer and inner peripheries 44, 46. Alternatively, as seen in dashed outline form in FIG. 3, the heat transmission limiting means can be a continuous, recessed groove 58 formed in the one surface 60 of the ring. The purpose for the apertures 56 (or the groove 58) will become apparent in the description of the method of constructing the laser envelop 12 later on.

The hard spider structure 38 of the bore support assembly 14 is positioned on one side of the joiner ring 36 and extends generally along the first central opening 54 thereof. The spider structure 38 has an outer peripheral portion 62, an inner peripheral portion 64 spaced radially inwardly from the outer peripheral portion 62, and a plurality of flexible spokes 66 extending radially between the outer and inner peripheral portions 62, 64 and integrally interconnecting them together. The outer and inner peripheral portions 62, 64 are of concentric circular configurations.

More particularly, the outer peripheral portion 62 of the hard spider structure 38 is rigidly attached, such as by spot welds 68, to the inner periphery 46 of the joiner ring 36. The inner peripheral portion 64 of the hard spider structure 38 defines a second central opening 70 of a substantially smaller size than the size of the first central opening 54 of the joiner ring 36 and adapts the hard spider structure 38 to receive the bore tube 30 of the laser 10 therethrough for interconnection of the hard spider structure 38 to the exterior of the bore tube 30 by the preform annular element 42.

The inner peripheral portion 64 of the hard spider structure 38 is discontinuous, being defined in a plurality of circumferentially-spaced arcuate segments 64a-d. The spokes 66 of the hard spider structure 38 are grouped in pairs. Each pair of spokes 66 interconnects one of the inner peripheral portion segments 64a-d with the continuous outer peripheral portion 62 of the hard spider structure 38. The spokes 66 and outer and inner peripheral portions 62, 64 of the hard spider structure 38 are disposed in a common plane and capable of withstanding transverse shifting of the inner bore tube 30 relative to the outer envelop 12 but capable of accommodating longitudinal differential thermal expansion between the outer envelop 12 and inner bore tube 30.

The preform annular element 42 of the bore support assembly 14 is disposed within the second central opening 70 of the hard spider structure 38, between the arcuate segments 64a-d of the inner peripheral portion 64 and the exterior of the bore tube 30. The preform element 42, after being melted and cooled, rigidly attaches the inner peripheral portion arcuate segments 64a-d with the exterior of the inner bore tube 30. The preform element 42 is composed of a glass material having a melting temperature less than that of the material composing the outer envelop 12 and inner bore tube 30 of the laser 10. The joiner ring 36 is composed of a material, such as identified earlier, having a coefficient of thermal expansion similar to that of the glass material composing the outer envelop 12 and inner bore tube 30 of the laser 10.

The soft spring-type spider 40 of the bore support assembly 14 is positioned on an opposite side of the joiner ring 36 from the hard spider structure 38. Like the hard spider structure 38, the soft spider 40 extends generally along the first central opening 54 thereof. The soft spider 40 has an outer ring portion 72 being rigidly attached, such as by spot welds, to the inner periphery 46 of the joiner ring 36 and a plurality of inner flexible spring fingers 74 attached to the outer ring portion 72 and extending radially inwardly therefrom. The ends of the spring fingers 74 are capable of resiliently and slidably engaging the exterior of the inner bore tube 30. Particularly, the fingers 74 of the soft spider 40 are bent outwardly at an acute angle to the plane of the outer ring portion 72 of the soft spider 40.

The purpose of the soft spider 40 is to position the bore support assembly 14 at the proper axial location along the bore tube 30 during construction of the laser 10. Then, once construction of the laser 10 is completed, the soft spider 40 no longer serves any purpose after that.

Referring now to FIG. 4, the method of the present invention for constructing the outer envelop 12 of the laser 10 will be described in detail. As shown in FIG. 4, at the beginning of outer envelop construction, the bore support assembly 14, preform element 42, bore assembly outer tube section 50 and reservoir tube section 52 are separate components. The bore tube 30, which is fabricated earlier as a one-piece unit, is already fixed at its right end 32 to the right end of the bore assembly outer tube section 50. The bore tube 30 is always longer than the outer tube section 50 and so it extends from a left open end 76 of the outer tube section 50.

The first step of the construction method is to insert the bore support assembly 14 over the free end 34 of the bore tube 30, sliding the assembly 14 therealong to bring its outer periphery 44 into alignment and contact with the open end 76 of the outer tube section 50 of the outer envelop 12. Concurrently as the bore support assembly 14 is installed over the free end 36 of the bore tube 30 and brought into alignment with the open end 76 of the outer tube section 50, the spring fingers 74 of the soft spider 40 of the assembly 14 are brought into slidable engagement with the bore tube 30 to hold the assembly 14 stationary at the desired location. Next, the preform annular element 42 is applied over the free end 34 of the inner bore tube 30 and slipped therealong to a final position within the second central opening 70 through the inner periphery 46 of the joiner ring 36 and about the exterior of the bore tube 30.

Once bore support assembly 14 and preform annular element 42 are properly positioned on the bore tube 30, the free end 34 of the bore tube 30 is then inserted into an open end 78 of the reservoir tube section 52 of the outer envelop 12. Thereafter, the open end 78 of the reservoir tube section 52 is brought into alignment and contact with the open end 76 of the outer tube section 50 and into alignment with the outer periphery 44 of the joiner ring 36 of the bore support assembly 14.

The entire arrangement of components is then subjected to heating such as induced by r.f. radiation. In particular, the r.f. radiation heats up the periphery of the joiner ring 36 of the bore support assembly 14 to a temperature above the melting point of the glass material forming the separate outer envelop sections 50, 52. The elevated temperature of the joiner ring outer periphery 44 causes melting and bonding (upon cooling) of the respective open ends 76, 78 of the sections 50, 52 together so as to engage the outer periphery 44 of the joiner ring 36. The apertures 56 (or, alternatively, a recessed groove 58) in the joiner ring 36 substantially limit the transmission of heat from the outer periphery 44 of the ring radially inwardly toward the hard spider structure 38 and therefrom ultimately to the preform element 42. Thus, the element 42 which is composed of glass material having a lower melting point then the glass material of the outer envelop sections 50, 52 is not appreciably affected during application of heat for bonding the sections 50, 52 together. If a grove 58, as indicated by dashed lines, is utilized in place of the holes or apertures 56, the depth of the groove is sufficiently shallow to maintain the structural integrity of the ring 36.

Figure 5:
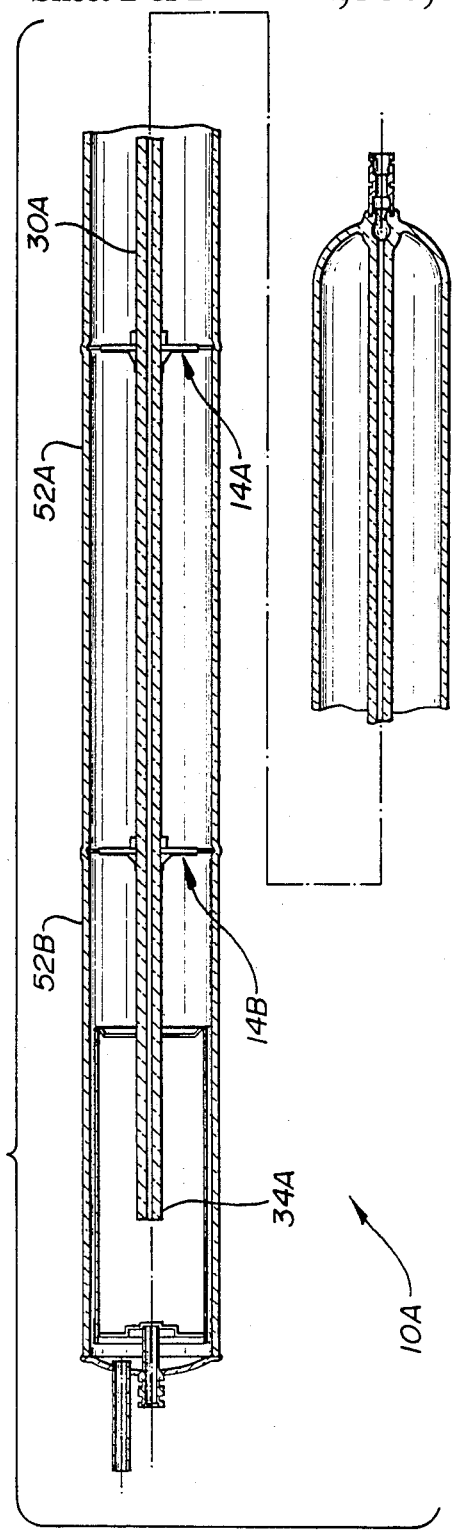
FIG. 5 is a longitudinal axial view of a laser, similar to laser of FIG. 1 but having a longer outer envelop and bore tube, the longer outer envelop being formed by one bore assembly tube section and a pair of reservoir tubes and bore support assemblies instead of only the one reservoir tube and bore support assembly in the outer envelop of the laser of FIG. 1.

Turning for a moment to FIG. 5, it will be observed that a longer laser 10A having two or more reservoir tube sections 52A, 52B and two or more bore support assemblies 14A, 14B can be constructed using the method of the present invention. The above-described steps are merely repeated for installing another bore support assembly 14B over the free end 34A of the longer bore tube 30A and attaching an open end of the second reservoir tube section 52B to an opposite open end of the first reservior tube section 52A of the outer envelop 12A.

Finally, construction of the laser outer envelop 12 is completed by the step of bonding the preform element 42 to the hard spider structure 38 and the bore tube 30. To melt the glass preform element 42, the laser is placed in a kiln in a vertical orientation with the element 42 resting on the inner peripheral portion 64 of the hard spider structure 38. The laser 10, including its outer envelop 12 and the bore support assembly 14, are heated to a temperature substantially below the melting point of the glass of the outer envelop 12 and above the melting point of the preform element 42 (for instance to 450 degrees C. for one hour), causing melting of the latter and adherence thereof to the inner peripheral portion 64 of the hard spider structure 38 and to the exterior of the bore tube 30.

In the preceding description, it is to be understood that such terms as "right" and "left" are words of convenience and are not to be construed as limiting terms.

Having thus described the bore support assembly and laser construction method of the present invention in detail and by reference to a preferred embodiment thereof, it will be apparent that modifications and variations are possible without departing from the scope of the invention defined in the appended claims.

What is claimed is:

1. A bore support assembly for use in a laser, comprising:
   a joiner ring having radially spaced outer and inner peripheries, said outer periphery being capable of rigid attachment to an outer envelope of a laser at the interior thereof, said inner periphery defining a first central opening of a first size adapting said ring to receive an inner bore tube of the laser therethrough; and
   a spider structure positioned on one side of said joiner ring and extending generally along said central opening thereof, said spider structure having an outer peripheral portion rigidly attached to said inner periphery of said joiner ring, an inner peripheral portion spaced radially inwardly from said outer peripheral portion and defining a second central opening of a second size smaller than said first size of said first central opening of said joiner ring and adapting said inner peripheral portion of said spider structure to receive the bore tube of the laser therethrough and be rigidly interconnected therewith, and a plurality of flexible members extending radially between and interconnecting said outer and inner peripheral portions of said spider structure.

2. The assembly of claim 1 in which said joiner ring is generally planar in configuration and of a size at its outer periphery adapting said ring to be positioned within and transversely across the outer envelope of the laser.

3. The assembly of claim 1 in which said joiner ring includes a plurality of heat transmission limiting means defined therein between said inner and outer peripheries thereof.

4. The assembly of claim 3 in which said heat transmission limiting means is a series of apertures defined through said ring.

5. The assembly of claim 1 in which said flexible members of said spider structure are spokes interconnecting said inner and outer peripheral portions.

6. The assembly of claim 5 in which said spokes and outer and inner peripheral portions of said spider structure are disposed in a common plane and capable of withstanding transverse shifting of the inner bore tube relative to the outer envelope but capable of accommodating longitudinal differential thermal expansion between the outer envelop and inner bore tube.

7. The assembly of claim 1 in which said inner peripheral portion of said spider structure is discontinuous, being defined in arcuate segments.

8. The assembly of claim 7 in which said flexible members of said spider structure are grouped in pairs, said each pair interconnecting one of said inner peripheral portion segments with said outer peripheral portion of said spider structure.

9. The assembly of claim 1 further comprising:
   a spring-type spider positioned on an opposite side of said joiner ring and extending generally along said central opening thereof, said spring-type spider having an outer ring portion rigidly attached to said inner periphery of said joiner ring and a plurality of inner spring fingers attached to said outer ring portion and extending radially inwardly therefrom, said fingers being capable of resiliently and slidably engagement with the inner bore tube when received through said second central opening of said spider structure.

10. The assembly of claim 9 in which said fingers of said spring-type spider are bent outwardly at an acute angle to the plane of said outer ring portion of said spider.

11. The assembly of claim 1 further comprising:
   annular-shaped means disposed within said second central opening of said spider structure and rigidly attached to said inner peripheral portion of said spider structure, said annular-shaped means being rigidly attachable to the inner bore tube about the exterior thereof when the bore tube is extended through said first and second central openings of said joiner ring and spider structure.

12. The assembly of claim 11 in which said annular-shaped means is a preform element composed of glass having a melting temperature less than that of the material composing the outer envelop and inner bore tube of the laser.

13. The assembly of claim 1 in which said joiner ring is composed of a material having a coefficient of thermal expansion similar to that of the material comprising the outer envelop and inner bore tube of the laser.

14. A bore support assembly for use in a laser, comprising:
a joiner ring having radially spaced outer and inner peripheries, said outer periphery being capable of rigid attachment to an outer envelope of a laser at the interior thereof, said inner periphery defining a first central opening of a first size adapting said ring to receive an inner bore tube of the laser therethrough, said joiner ring being planar in configuration and of a size at its outer periphery adapting said ring to be positioned within and transversely across the outer envelop of the laser;
a spider structure positioned on one side of said joiner ring and extending generally along said central opening thereof, said spider structure having an outer peripheral portion rigidly attached to said inner periphery of said joiner ring, an inner peripheral portion spaced radially inwardly from said outer peripheral portion and defining a second central opening of a second size smaller than said first size of said first central opening of said joiner ring and adapting said inner peripheral portion of said spider structure to receive the bore tube of the laser therethrough, and a plurality of resiliently flexible spokes extending radially between and integrally interconnecting said outer and inner peripheral portions of said spider structure; and
annular-shaped means disposed within said second central opening and rigidly attached to said inner peripheral portion of said spider structure, said annular-shaped means being rigidly attachable to the exterior of the inner bore tube about the location thereof where it extends through said first and second central openings of said joiner ring and spider structure for rigidly interconnecting said spider structure to said bore tube;
said spokes and outer and inner peripheral portions of said spider structure being disposed in a common plane and capable of withstanding transverse shifting of the inner bore tube relative to the outer envelop but being sufficiently flexible to accommodate longitudinal differential thermal expansion between the outer envelop and inner bore tube.

15. The assembly of claim 14 in which said joiner ring includes heat transmission limiting means defined therein between said inner and outer peripheries thereof.

16. The assembly of claim 15 in which said heat transmission limiting means is a series of apertures defined through said ring.

17. The assembly of claim 14 in which said inner peripheral portion of said spider structure is discontinuous, being defined in circumferentially-spaced arcuate segments.

18. The assembly of claim 17 in which said spokes of said spider structure are grouped in pairs, said each pair of spokes interconnecting one of said inner peripheral portion segments with said outer peripheral portion of said spider structure.

19. In a laser having a coaxially arranged and radially spaced outer envelop and inner bore tube, said bore tube being disposed within said outer envelop and having one end fixed to an end of said envelop and an opposite free end axially spaced from an opposite end of said envelop, a bore support assembly comprising:
a joiner ring being disposed within said outer envelop at a location along said inner bore tube closer to said opposite free end than said one fixed end thereof, said ring having radially spaced outer and inner peripheries, said outer periphery being rigidly attached to said outer envelop at the interior thereof, said inner periphery defining a first central opening of a first size receiving said inner bore tube therethrough, said joiner ring being planar in configuration and of a size at its outer periphery adapting said ring to be positioned in tight fitting relation within and extend transversely across the interior of said outer envelop;
a spider structure positioned on one side of said joiner ring and extending generally along said central opening thereof, said spider structure having an outer peripheral portion rigidly attached to said inner periphery of said joiner ring, an inner peripheral portion spaced radially inwardly from said outer peripheral portion and defining a second central opening of a second size smaller than said first size of said first central opening of said joiner ring and receiving said bore tube therethrough, and a plurality of resiliently flexible spokes extending radially between and integrally interconnecting said outer and inner peripheral portions of said spider structure; and
annular-shaped means disposed within said second central opening and rigidly attached to said inner peripheral portion of said spider structure and to the exterior of said inner bore tube at said location therealong closer to said opposite free end than said one fixed end thereof and at where said bore tube extends through said first and second central openings of said joiner ring and spider structure;
said spokes and outer and inner peripheral portions of said spider structure being disposed in a common plane and capable of withstanding transverse shifting of said inner bore tube relative to the outer envelop but being sufficiently flexible to accommodate longitudinal differential thermal expansion between the outer envelop and inner bore tube.

20. The assembly of claim 19 in which said joiner ring includes a plurality of heat transmission limiting means defined therein between said inner and outer peripheries thereof.

21. The assembly of claim 20 in which said heat transmission limiting means is a series of apertures defined through said ring.

22. The assembly of claim 19 in which said inner peripheral portion of said spider structure is discontinuous, being defined in circumferentially-spaced arcuate segments.

23. The assembly of claim 22 in which said spokes of said spider structure are grouped in pairs, said each pair of spokes interconnecting one of said inner peripheral portion segments with said outer peripheral portion of said spider structure.

24. In a method of constructing a laser, the combination comprising the steps:
   inserting a bore support assembly over a free end of a bore tube being fixedly mounted at its opposite end in one end of a first section of an outer envelope of a laser to be constructed;
   bringing an outer periphery of the bore support assembly into alignment and contact with the opposite, open end of the first section of the outer envelop;
   inserting the free end of the bore tube into an open end of a second section of the outer envelop;
   bringing the open end of the second section of the outer envelop into alignment and contact with the open end of the first section thereof and into alignment with the periphery of the bore support assembly; and
   heating the first and second outer envelop sections and the bore support assembly to increase the temperature of the outer periphery of the bore support assembly and cause melting and bonding of the respective open ends of the first and second sections together and to the outer periphery of the bore support assembly.

25. The method of claim 24 in which said inserting of the bore support assembly over the free end of the bore tube includes inserting a spring-type spider of the bore support assembly over the bore tube free end and into sliding engagement with the bore tube.

26. The method of claim 24 in which the steps are repeated for installing another bore support assembly over the free end of the bore tube and attaching an open end of a third section to an opposite open end of the second section of the outer envelop to construct a longer laser.

27. The method of claim 24 in which said heating of the first and second outer envelop sections and the bore support assembly is induced by r.f. radiation.

28. The method of claim 24 further comprising:
   limiting the transmission of heat in the bore support assembly from the outer periphery thereof radially inwardly toward the bore tube during heating of the first and second sections of the outer envelope and of the bore support assembly.

29. The method of claim 24 further comprising:
   applying a bonding element to an inner periphery of the bore support assembly which fits over the bore tube upon insertion of the bore support assembly over the free end thereof.

30. The method of claim 29 further comprising:
   heating the outer envelop sections and the bore support assembly to a temperature below the melting point of the outer envelop section and above the melting point of the bonding element to cause melting and adherence of the bore support assembly at its inner periphery by the bonding element to the bore tube.

* * * * *